United States Patent
Park et al.

(10) Patent No.: US 6,941,141 B2
(45) Date of Patent: Sep. 6, 2005

(54) CALL CONTROL METHOD FOR HANDOFF GUARANTEE IN MOBILE TERMINAL

(75) Inventors: Jun Seok Park, Taejon (KR); Ji Yeon Son, Taejon (KR); Dong Won Han, Taejon (KR)

(73) Assignee: Electronics and Telecommunications, Taejon (KR)

( * ) Notice: Subject to any disclaimer, the term of this patent is extended or adjusted under 35 U.S.C. 154(b) by 510 days.

(21) Appl. No.: 10/092,888

(22) Filed: Mar. 8, 2002

(65) Prior Publication Data

US 2003/0114159 A1 Jun. 19, 2003

(30) Foreign Application Priority Data

Dec. 18, 2001 (KR) ........................................ 2001-80722

(51) Int. Cl.⁷ ............................ H04Q 7/20; H04Q 7/00
(52) U.S. Cl. ....................... 455/436; 455/438; 455/439; 455/450; 455/451; 455/452.1; 455/452.2; 370/331
(58) Field of Search ......................... 455/436, 438–439, 455/450, 451, 452.1, 452.2; 370/331

(56) References Cited

U.S. PATENT DOCUMENTS

| | | | | |
|---|---|---|---|---|
| 5,301,356 A | * | 4/1994 | Bodin et al. ................ | 455/436 |
| 5,465,389 A | * | 11/1995 | Agrawal et al. ............ | 455/437 |
| 5,530,912 A | * | 6/1996 | Agrawal et al. ............ | 455/450 |
| 6,181,941 B1 | * | 1/2001 | McCarthy .................... | 455/436 |
| 6,212,389 B1 | * | 4/2001 | Fapojuwo .................... | 455/453 |
| 6,216,006 B1 | * | 4/2001 | Scholefield et al. ........ | 455/450 |
| 6,278,882 B1 | | 8/2001 | Choi | |
| 6,529,733 B1 | * | 3/2003 | Qing-An ..................... | 455/437 |
| 6,535,742 B1 | * | 3/2003 | Jiang et al. ............... | 455/452.2 |
| 6,628,949 B1 | * | 9/2003 | Park ........................... | 455/436 |

OTHER PUBLICATIONS

David A. Levine, et al.; A Resource Estimation and Call Admission Algorithm for Wireless Multimedia Networks Using the Shadow Cluster Concept; Feb. 1997 IEEE; p.1–12.

Anthony S. Acampora and Mahmoud Naghshineh; Control and Quality–of–Service Provisioning in High–Speed Microcellular Networks; 1994 IEEE Personal Communications; p.36–43.

* cited by examiner

Primary Examiner—Lee Nguyen
Assistant Examiner—Wen Huang
(74) Attorney, Agent, or Firm—Mayer, Brown, Rowe & Maw LLP

(57) ABSTRACT

The invention relates to a call control method for handoff guarantee in a mobile terminal for minimizing handoff failure rate which continuously guarantees the same quality of service is during handoff of an existing call from the current cell into a new cell in a high-speed radio communication network which is constituted of micro-cells to support multimedia traffic. The bandwidth reservation is performed in the adjacent cells, call approval control is performed by temporarily storing a handoff request into a queue when an available bandwidth is insufficient, and a radio bandwidth is dynamically managed so as to efficiently use communication network resources. Further, new call block rate and handoff failure rate are periodically monitored for adaptation to dynamic variation of the communication network traffic state, by which the amount of a reserved bandwidth is dynamically adjusted according to the state so as to efficiently use communication network resources.

19 Claims, 4 Drawing Sheets

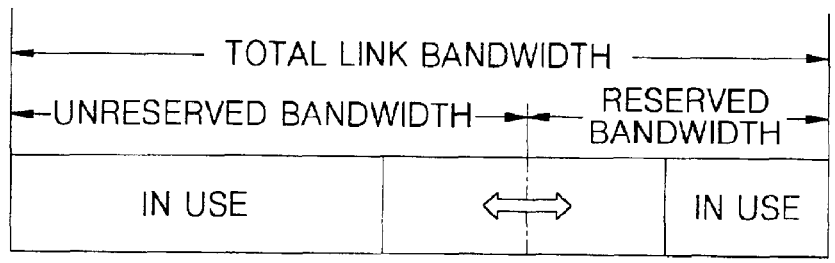

(b)

```
Monitor(CB_THRESHOLD, HB_THRESHOLD, time_interval)
{
  while(TRUE) {
      wait(time_interval); CB_MEASUREMENT, HD_MEASUREMENT CALCULATION;
      if (CB_MEASUREMENT > CB_THRESHOLD && HD_MEASUREMENT < HD_THRESHOLD )
          BW_RESERVED = MIN(down * BW_RESERVED, BW_RESERVED + BW_AVAILABLE)
   else if (CB_MEASUREMENT < CB_THRESHOLD && HD_MEASUREMENT > HD_THRESHOLD )
          BW_RESERVED = MIN(up * BW_RESERVED, BW_RESERVED + BW_AVAILABLE)
   else if (CB_MEASUREMENT < CB_THRESHOLD && HD_MEASUREMENT < HD_THRESHOLD )
          No Adaptation
   else if (CB_MEASUREMENT > CB_THRESHOLD && HD_MEASUREMENT > HD_THRESHOLD )
          CELL spliting
       endif;
   }
}
```

CALL CONTROL METHOD FOR HANDOFF GUARANTEE IN MOBILE TERMINAL

BACKGROUND OF THE INVENTION

1. Field of the Invention

The present invention relates to a call control method for handoff guarantee in a mobile terminal, in particular, for minimizing handoff failure rate so as to continuously guarantee the same quality of service during handoff of an existing call from the current cell into a new cell in a high-speed radio communication network which is constituted of micro-cells to support multimedia traffic.

2. Description of the Related Art

At present, a mobile communication network structure is composed of macro-cell units with application radii of several Km to provide a communication service mainly based upon audio and short messages. However, high transmission capacity is required to the mobile communication network by the following reasons: the number of mobile terminals increases, the amount of radio bandwidth is restricted, and it is necessary to support a multimedia application requiring a wide band service. In order to provide the foregoing, a future mobile communication network structure will be embodied as a micro-cell or pico-cell structure having an application radius of several hundred meters.

In the mobile communication network structure having such micro-cells or pico-cells, downsizing cells will reduce the application area of each cell while probably accompanying high handoff rate and incurring rapid variation to the traffic state of the network. This may barely guarantee the service quality about multimedia traffic.

Overload may occur in a specific cell due to movement of terminals, and thus adequate control about a new call should be carried out in preparation for a situation that a terminal moves into the overloaded cell. Otherwise, it is barely guaranteed that network resources allocated while initially setting the new call is identically used in the new cell.

This breaks the handoff which occurs as the existing call moves into the new cell fails, thereby disconnecting the call. Minimization of handoff failure rate is required so that the call can be continuously served without disconnection while the terminal moves. The handoff failure rate which does not exist in a wire communication network is a new and important parameter of system performance in the mobile communication network.

A call control method for reducing the handoff failure rate can be mainly divided into three schemes:

First, a handoff request queuing for allowing handoff, which queues a handoff call when a bandwidth is unavailable in a destination cell during handoff and allocates the bandwidth to the handoff call prior to a new call if there is any available bandwidth by using a time delay that a mobile terminal can allow within a handoff area overlapped between cells;

Second, an exclusive bandwidth reservation for partially allocating the bandwidth of a cell to previously reserve the bandwidth in preparation for handoff, in which the bandwidth is allocated by requesting reservations from all adjacent cells or part of cells having a high destination probability of a mobile terminal whenever a new call is initialized, and dynamically adjusted according to the communication network state in order to effectively use the radio bandwidth; and Third, a restrictive approval scheme of a new call in preparation for handoff which collects state information from the current cell where a mobile terminal is located and surrounding cells adjacent to the current cell and approves connection of the new call based upon handoff provability into the adjacent surrounding cells according to the variation of future time depending on correct information about a movement pattern of the mobile terminal.

Therefore, supporting a multimedia service in the radio communication network has a number of sophisticated problems due to characteristics such as the mobility of the mobile terminal, restricted bandwidth and high error rate, which may not occur in the conventional wire communication network.

First, the mobile terminal can move to any place while the call connection is set so that handoff occurs during cell switching in the radio area due to the movement of the mobile terminal. The handoff should be so carried out that the existing connection may be not cut, and the service quality requested in the connection should be continuously guaranteed. Further, re-routing of the existing connection and change of a call connection path are accompanied, and control information for controlling the same consumes the insufficient radio communication resources. Therefore, it is required a method for minimizing the amount of control information necessary for the handoff while rapidly carrying out the handoff.

Second, when a call is set in the cell where the mobile terminal is currently located, the service quality is guaranteed by the communication network as long as the cell is not changed. However, when mobile terminals concentrically accumulate into any cell, the available bandwidth in the cell is temporarily insufficient for accepting the requests of the mobile terminals. Therefore, the current service quality in use may be degraded or the call may be disconnected. Such a phenomenon should be prevented from occurring while the call is set even though the mobile terminal is moving.

Third, the bandwidth of the radio communication network is considerably restricted compared to the wire communication network. The bandwidth is highly valuable resources in the radio communication network, thereby requiring a method for effectively using the same.

SUMMARY OF THE INVENTION

Accordingly, the present invention has been devised to solve the foregoing problems of the prior art and it is an object of the invention to provide a call control method for handoff guarantee in a mobile terminal for minimizing handoff failure rate so as to continuously guarantee the same quality of service during handoff of an existing call from the current cell into a new cell in a high-speed radio communication network which is constituted of micro-cells to support multimedia traffic.

It is another object of the invention to provide a call control method for handoff guarantee in a mobile terminal, which is based upon bandwidth reservation, performs call approval control by temporarily storing a handoff request into a queue when an available bandwidth is insufficient and dynamically manages a radio bandwidth so as to efficiently use communication network resources.

It is further another object of the invention to provide a call control method for handoff guarantee in a mobile terminal, which periodically monitors new call block rate and handoff failure rate for adaptation to dynamic variation of the communication network traffic state, by which the amount of a reserved bandwidth is dynamically adjusted according to the state so as to efficiently use communication network resources.

It is still another object of the invention to provide a computer-readable record medium storing a program which performs a call control method for handoff guarantee in a mobile terminal.

According to an aspect of the invention to obtain the foregoing objects, a call control method for handoff guarantee in a mobile terminal comprises the following steps of: judging whether the requested maximum bandwidth is allocable within the available bandwidth of the current cell when a received new call requests the maximum and minimum bandwidths; if the requested maximum bandwidth is allocable within the available bandwidth of the current cell, requesting handoff from an adjacent cell into the current cell and inspecting a handoff queue to judge whether a standby call exists in the handoff queue; if the standby call does not exist in the handoff queue, approving the new call; and requesting a bandwidth reservation from the adjacent cell after allocating the minimum one of the requested maximum bandwidth and the available bandwidth of the cell to an application which currently requests call set-up about the approved call.

The method further comprises the step of blocking the new call if the requested maximum bandwidth is not allocable within the available bandwidth of the current cell or the standby call exists in the handoff queue.

Preferably, the call has a guaranteed traffic type.

According to another aspect of the invention to obtain the foregoing objects, a call control method for handoff guarantee in a mobile terminal comprises: the following steps of: (a) judging whether the requested minimum bandwidth of handoff is allocable within the currently reserved bandwidth to allocate the requested minimum bandwidth if allocable, when a received handoff call requests the maximum and minimum bandwidths used in a previous call from a base station of a destination cell of the mobile terminal; (b) if not allocable, judging whether the available bandwidth exists in the unreserved bandwidth of the current cell to approve the corresponding call if available and regulate the corresponding call to stand by in a handoff queue if unavailable; judging whether the standby time of the handoff call in the handoff queue exceeds the maximum allowable handoff expiration time to approve the handoff call if not exceeds and block the handoff call if exceeds; allocating the minimum one of the requested maximum bandwidth and the added value of the reserved bandwidth and the available bandwidth in the unreserved bandwidth of the cell; and requesting a bandwidth reservation from an adjacent cell and requesting a previous base station of the handoff call to cancel the bandwidth reserved to a previously adjacent cell. In this method, the step of blocking the handoff call comprises: processing the standby handoff call according to a First-In First-Out scheme.

Preferably, the step of blocking the handoff call comprises: approving the handoff call after allocating the requested minimum bandwidth of handoff within the currently reserved bandwidth if the standby time does not exceed the maximum allowable handoff expiration time.

Preferably, the call has a guaranteed traffic type.

The method further comprises the step of periodically monitoring new call block rate and handoff failure rate by measuring the same to adjust the amount of the bandwidth according to a result of monitoring.

Preferably, the step of adjusting the amount of the bandwidth comprises: adjusting the bandwidth reserved for handoff by judging whether the measurement of the new call block rate exceeds the threshold block value of new call as the reference of communication service quality in the current cell and whether the measurement of the handoff failure rate exceeds a pre-set threshold failure value.

Preferably also, the step of adjusting the amount of the bandwidth comprises: reducing the amount of the reserved bandwidth by judging that the bandwidth is excessively reserved for handoff if the measurement of the new call block rate exceeds the threshold block value of new call which is the reference of the communication service quality of the current cell and the measurement of the handoff failure rate does not exceed the pre-set threshold failure value.

Also preferably, the step of adjusting the amount of the bandwidth comprises: increasing the reserved bandwidth by judging that the bandwidth is insufficiently reserved for handoff if the measurement of the new call block rate does not exceed the threshold block value of new call which is the reference of the communication service quality of the current cell and the measurement of the handoff failure rate exceeds the pre-set threshold failure value.

In addition, the method further comprises the step of subdividing the cell by judging that users are concentrated in the current cell exceeding the limit of cell capacity if the measurement of the new call block rate is maintained at least the threshold block value of new call which is the reference of communication service quality of the current cell and the measurement of the handoff failure rate is maintained at least the pre-set threshold failure value for a predetermined time.

According to further another aspect of the invention to obtain the foregoing objects, a record medium readable by a digital processing device records a tangibly embodied program of instructions executable by the digital processing device to perform a call control method for handoff guarantee in a mobile terminal, wherein the program is executed in the following steps of: judging whether the requested maximum bandwidth is allocable within the available bandwidth of the current cell when a received new call requests the maximum and minimum bandwidths; if the requested maximum bandwidth is allocable within the available bandwidth of the current cell, requesting handoff from an adjacent cell into the current cell and inspecting a handoff queue to judge whether a standby call exists in the handoff queue; if the standby call does not exist in the handoff queue, approving the new call; and requesting a bandwidth reservation from the adjacent cell after allocating the minimum one of the requested maximum bandwidth and the available bandwidth of the cell to an application which currently requests call set-up about the approved call.

According to still another aspect of the invention to obtain the foregoing objects, a record medium readable by a digital processing device records a tangibly embodied program of instructions executable by the digital processing device for performing a call control method for handoff guarantee in a mobile terminal, wherein the program is executed in the following steps of: (a) judging whether the requested minimum bandwidth of handoff is allocable within the currently reserved bandwidth to allocate the requested minimum bandwidth if allocable, when a received handoff call requests the maximum and minimum bandwidths used in a previous call from a base station of a destination cell of the mobile terminal; (b) if not allocable, judging whether the available bandwidth exists in the unreserved bandwidth of the current cell to approve the corresponding call if available and regulate the corresponding call to stand by in a handoff queue if unavailable; judging whether the standby time of the handoff call in the handoff queue exceeds the maximum allowable handoff expiration time to approve the handoff call if not exceeds and block the handoff call if exceeds; allocating the minimum one of the requested maximum bandwidth and the added value of the reserved bandwidth and the available bandwidth in the unreserved bandwidth of the cell; and requesting a bandwidth reservation from an adjacent cell and requesting a previous base station of the handoff call to cancel the bandwidth reserved to a previously adjacent cell.

BRIEF DESCRIPTION OF THE DRAWINGS

In the following drawings:

FIGS. 4A and 4B are drawings explaining an operational bandwidth procedure based upon the state of a mobile communication network according to the invention, in which FIG. 4A shows the structure of an operational bandwidth, and FIG. 4B explains a procedure for adjusting the operational bandwidth.

DETAILED DESCRIPTION OF THE PREFERRED EMBODIMENT

The following detailed description will present a preferred embodiment of a call control method for handoff guarantee in a mobile terminal according to the present invention in reference to the accompanying drawings.

Figure 1:
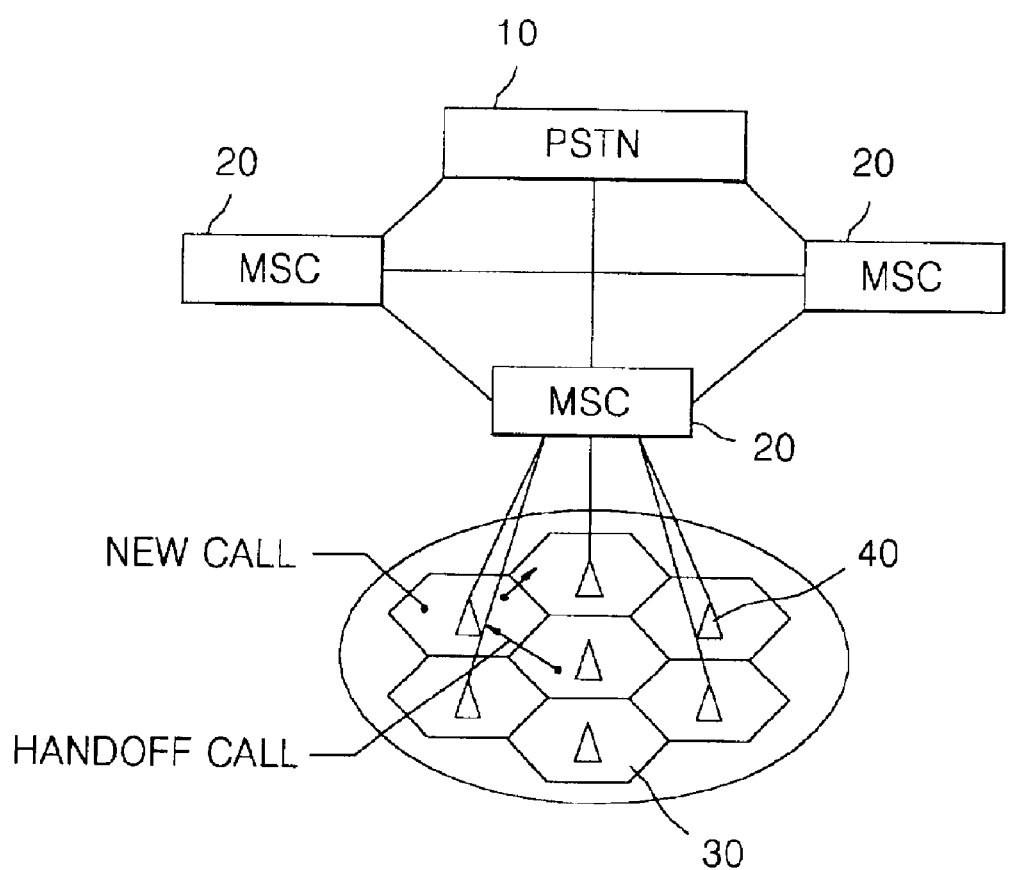
FIG. 1 is a block diagram illustrating the connection construction of a general mobile communication network for handoff.

FIG. 1 is a block diagram illustrating the structure of a mobile communication network according to the invention.

In the mobile communication network structure, as shown in FIG. 1, a radio area is divided into a plurality of cells 30, in which each of the cells 30 has a base station 40 for managing mobile terminals in the cell.

Communication between the mobile terminal and the base station 40 is performed via radio link. The base stations 40 compose a cluster, and all of the base stations 40 in the cluster are connected to a Mobile Switching Center (hereinafter will be referred to as MSC).

The MSC 20 performs a function to connect between mobile communication subscribers as well as connect a mobile communication subscriber to a Public Switching Telephone Network (PSTN) 10 via a wire link.

The number of available channels in a mobile communication network is fixed, and the base stations 40 are arranged to reuse the channels at such a distance that may not incur inter-channel interference.

Such a mobile communication network increases the total capacity of the radio area with the restricted channel number by reusing the channels.

Figure 2:
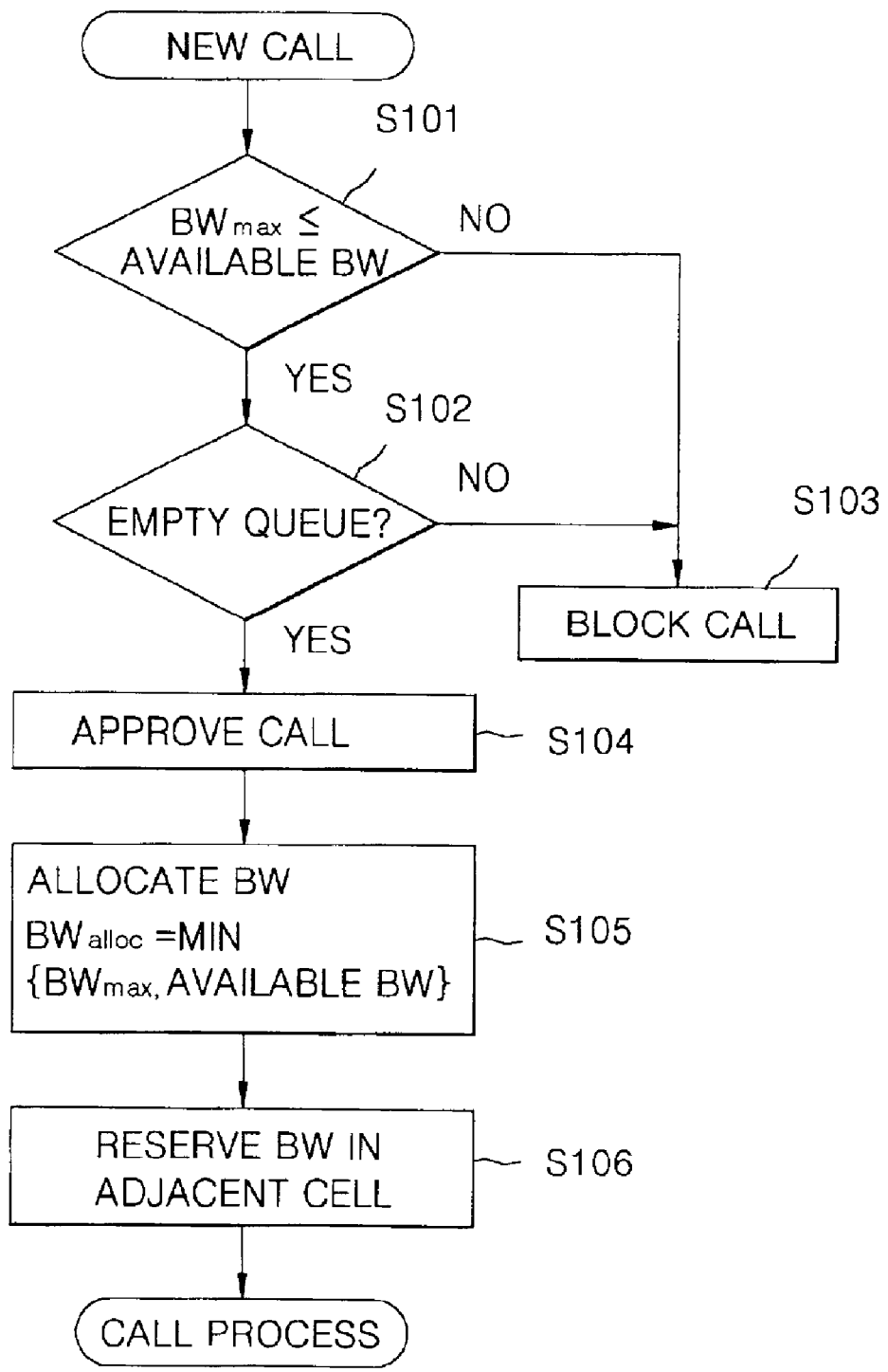
FIG. 2 is a flow chart illustrating an operation of a new call approval method in a mobile terminal according to the invention.

FIG. 2 is a flow chart illustrating an operation of a new call approval method in a mobile terminal according to the invention.

As shown in FIG. 2, when a new call requests bandwidths $BW_{min}$ and $BW_{max}$, a base station receiving the call judges whether the requested maximum bandwidth $BW_{max}$ is allocable within the available bandwidth of the current cell in S101.

If it is judged that the requested maximum bandwidth $BW_{max}$ cannot be allocated in the available bandwidth of the current cell, the new call is blocked in S103.

However, if it is judged that the requested maximum bandwidth $BW_{max}$ is allocable in the available bandwidth of the current cell or the available bandwidth can accept the requested maximum bandwidth $BW_{max}$ in S101, it is judged whether a call stands by for allocation of the bandwidth requesting handoff from an adjacent cell into the current cell in S102. If no call stands by in the handoff queue, the request is approved in S104. If any call stands by in the handoff queue, the call is blocked in S103.

In order to allocate the bandwidth to the approved call, the base station allocates the minimum one in the requested maximum bandwidth $BW_{max}$ and the available bandwidth of the cell to provide the best available service quality to an application which currently requested call set-up in S105.

After completing allocation to the new call, the base station of the current cell requests a bandwidth reservation from an adjacent cell only if the call being currently in service has a guaranteed traffic type in S106. A response to the request is not expected.

Figure 3:
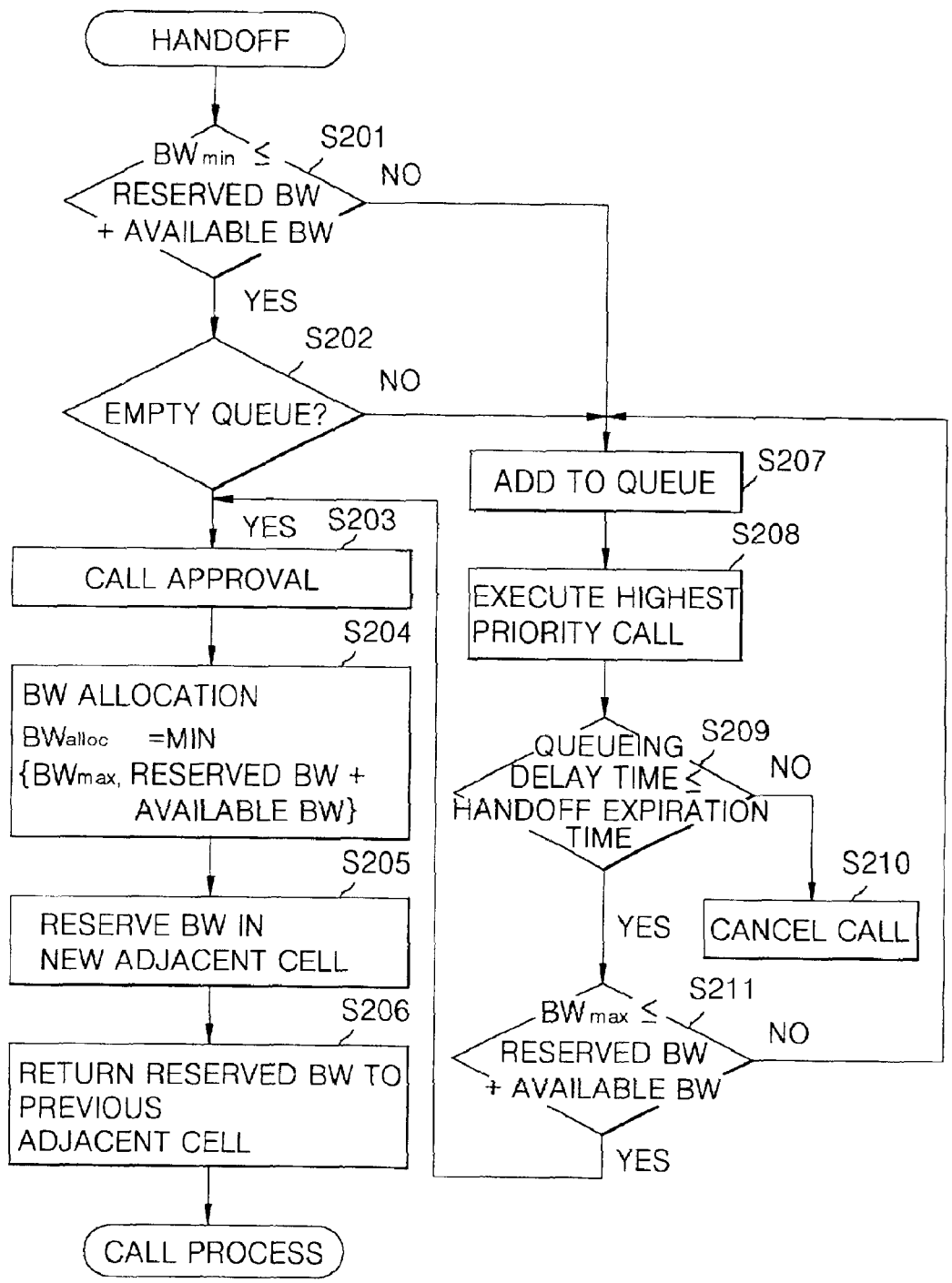
FIG. 3 is a flow chart illustrating an operation of a call control method for handoff in a mobile terminal according to the invention.

FIG. 3 is a flow chart illustrating an operation of a call control method for handoff in a mobile terminal according to the invention.

The call generated in handoff during cell-switching in the mobile terminal presents the bandwidths $BW_{min}$ and $BW_{max}$ used in the existing call as the request bandwidths to the base station of a destination cell when requesting handoff.

In S201, the base station which received the call allocates the requested minimum bandwidth $BW_{min}$ if the requested minimum bandwidth $BW_{min}$ is allocable within the currently reserved bandwidth, or judges whether an available bandwidth exists in the unreserved bandwidth of the current cell if the reserved bandwidth is insufficient.

If it is judged that the requested minimum bandwidth $BW_{min}$ is not allocable in the available bandwidth including the reserved bandwidth and the unreserved bandwidth of the current cell, the base station regulates the call to stand by in a handoff queue instead of canceling a call process in S207.

However, if the requested minimum bandwidth $BW_{min}$ is allocable in the bandwidth including the reserved bandwidth and the unreserved bandwidth of the current cell, i.e. the requested bandwidth can be accepted, it is judged whether the handoff queue is empty in S202.

If the handoff queue is empty, i.e. no call stands by in the handoff queue, handoff is approved in S203. Otherwise, the call stands by in the handoff queue in S207.

The standby call in the handoff queue is processed according to a First-In First-Out (FIFO) scheme, i.e. any call having the highest priority is primarily processed in S208. Therefore, the handoff call standing by for the longest time in the queue is served if the available bandwidth takes place.

When the standby handoff call in the queue is served, it is judged whether the standby time of the call in the handoff queue or queuing delay time exceeds the maximum allowable handoff expiration time in S209.

If the standby time of the call in the handoff queue or queuing delay time exceeds the maximum allowable handoff expiration time, the call process is blocked in S210 for the following reason. If the bandwidth is not allocated until the maximum allowable handoff expiration time, communication with the previous cell is impossible so that soft handover cannot be performed. Herein, the soft handoff means that connection with a previous cell is cut after completing handoff into a new cell.

On the contrary, if the handoff queuing delay time of the call does not exceed the maximum allowable handoff expiration time, it is judged whether the reserved bandwidth or the unreserved bandwidth of the current cell have the available bandwidth for the requested minimum bandwidth $BW_{min}$, of handoff in S211.

If it is judged that the reserved bandwidth or the unreserved bandwidth of the current cell have the available bandwidth for the requested minimum bandwidth $BW_{min}$ of handoff, the call is approved in S203. Otherwise, the call further stands by in the handoff queue S207.

In order to allocate the bandwidth to the handoff-approved call, the minimum value is allocated from the requested maximum bandwidth $BW_{max}$ and the added value of the reserved bandwidth and the available bandwidth in the unreserved bandwidth of the cell to provide the best available service quality to the application which requested handoff in S204 as in the new call.

After completing bandwidth allocation to the handoff, the station of the current cell requests a bandwidth reservation from a new adjacent cell due to the handoff in S205. This is performed only if the handoff currently being in service has a guaranteed traffic type.

Further, the base station requests that the previous base station of the call to which the handoff is performed cancels a bandwidth which is reserved to an adjacent cell in S206.

FIGS. 4A and 4B are drawings explaining an operational bandwidth procedure based upon the state of a mobile communication network according to the invention, in which FIG. 4A shows the structure of an operational bandwidth, and FIG. 4B explains a procedure for adjusting the operational bandwidth.

The radio bandwidth of the mobile communication network is shared by a plurality of mobile terminals, and thus should be managed so as to be effectively used. Therefore, the invention manages only a certain portion into a pool type reserved from the total requested bandwidth which is requested at call set-up, and the reserved bandwidth is used for handoff by using a statistical multiplexing scheme.

As shown in FIG. 4A, the total bandwidth of a cell is divided into the unreserved bandwidth and the reserved bandwidth, in which the reserved bandwidth is allocated when handoff is performed to a preferential traffic call and a guaranteed traffic call.

The total bandwidth at a time t can be expressed as in following Equation 1:

$$C_{total} = C_{used}(t) + C_{free}(t) + C_{reserv}(t) \quad \text{Equation 1,}$$

wherein $C_{total}$ is the total bandwidth of the cell, $C_{used}(t)$ is the bandwidth being used, $C_{free}(t)$ is the available bandwidth, and $C_{reserv}(t)$ is the reserved bandwidth.

Further, the amount of the reserved bandwidth at a time t is expressed as in Equation 2:

$$C_{reserv}(t) = \text{MIN}(\frac{1}{6}(1+\alpha)^i \times \Sigma_{i=1} B_{min}(i),$$
$$C_{total} - {}^k C_{used}(t)) - \Sigma_{i=1} B_{min}(i) \quad \text{Equation 2,}$$

wherein i is the number of reservation request for handoff, k is the number of cancel request, and $B_{min}(i)$ is the requested minimum bandwidth requested for reservation by calls which are set in the current and adjacent cells requested bandwidth reservation.

Herein, α has an initial value of 0 and is variably controlled according to the traffic load of the cell. Based upon new call block rate and handoff failure rate set by each base station, α is positive if the handoff failure rate is higher and negative if the new call block rate is higher.

The guaranteed traffic call is provided with a service differentiated in respect to the preferential traffic call: if the reserved bandwidth is exhausted and the available unreserved bandwidth is insufficient so that the bandwidth is not allocated to the guaranteed traffic call, the bandwidth allocated to the preferential traffic call is partially selected and allocated to the guaranteed traffic call.

The amount of the reserved bandwidth is adjusted according to the state of the communication network traffic in order to raise the usage of the communication network bandwidth, i.e. the each base station periodically measures and monitors the new call block rate and the handoff failure rate in order to measure the quality of communication service in the current cell. The standard of decision for adjusting the amount of the reserved bandwidth follows the procedure, as shown in FIG. 4B, based upon measurements.

If a measurement of the new call block rate exceeds the threshold block value of new call which is a reference of the communication service quality of the current cell but the handoff failure rate does not exceed a threshold failure value which is another reference of the service quality, the amount of the reserved bandwidth is reduced by a large margin. Otherwise, the bandwidth reserved for handoff is excessively reserved and the unreserved bandwidth for the new call is overly reduced, resulting in degrading the service quality of the new call.

On the contrary, however, the bandwidth for handoff is reserved in an excessively small amount to increase the handoff failure rate. Therefore, the amount of the reserved bandwidth is increased.

If each of the new call block rate and the handoff failure rate is maintained at the reference threshold value or less, the service quality provided in the cell is satisfied and thus any bandwidth adjustment is not required.

Finally, users are concentrated in the current cell exceeding the limit of cell capacity if each of the new call block rate and the handoff failure rate is maintained over the reference threshold value for at least a predetermined time period. Then, it is necessary to restructure the cell through subdividing.

With the call control method for handoff guarantee in a mobile terminal for minimizing handoff failure rate according to the invention as described hereinbefore, the same quality of service is continuously guaranteed during handoff of an existing call from the current cell into a new cell in a high-speed radio communication network which is constituted of micro-cells to support multimedia traffic. In the invention, the bandwidth reservation is performed in the adjacent cells, call approval control is performed by temporarily storing a handoff request into a queue when an available bandwidth is insufficient, and a radio bandwidth is dynamically managed so as to efficiently use communication network resources.

Further, new call block rate and handoff failure rate are periodically monitored for adaptation to dynamic variation of the communication network traffic state, by which the amount of a reserved bandwidth is dynamically adjusted according to the state so as to efficiently use communication network resources.

What is claimed is:

1. A call control method for handoff guarantee in a mobile terminal, the method comprising the following steps of:
   (a) judging whether the requested minimum bandwidth of handoff is allocable within the currently reserved bandwidth to allocate the requested minimum bandwidth if allocable, when a received handoff call requests the maximum and minimum bandwidths used in a previous call from a base station of a destination cell of the mobile terminal;

(b) if not allocable, judging whether the available bandwidth exists in the unreserved bandwidth of the current cell to approve the corresponding call if available and regulate the corresponding call to stand by in a handoff queue if unavailable;

judging whether the standby time of the handoff call in the handoff queue exceeds the maximum allowable handoff expiration time to approve the handoff call if not exceeds and block the handoff call if exceeds;

allocating the minimum one of the requested maximum bandwidth and the added value of the reserved bandwidth and the available bandwidth in the unreserved bandwidth of the cell; and requesting a bandwidth reservation from an adjacent cell and requesting a previous base station of the handoff call to cancel the bandwidth reserved to a previously adjacent cell.

2. A call control method for handoff guarantee in a mobile terminal according to claim 1, further comprising the step of blocking the handoff call by processing the standby handoff call according to a First-In First-Out scheme.

3. A call control method for handoff guarantee in a mobile terminal according to claim 1, further comprising the step of blocking the handoff call wherein if the standby time does not exceed the maximum allowable handoff expiration time, the handoff call is approved after allocating the requested minimum bandwidth of handoff within the currently reserved bandwidth.

4. A call control method for handoff guarantee in a mobile terminal according to claim 1, wherein the call has a guarantee traffic type.

5. A call control method for handoff guarantee in a mobile terminal according to claim 1, further comprising the step of periodically monitoring new call block rate and handoff failure rate by measuring the same to adjust the amount of the bandwidth according to a result of monitoring.

6. A call control method for handoff guarantee in a mobile terminal according to claim 5, the further comprising the step of adjusting the amount of the bandwidth by adjusting the bandwidth reserved for handoff by judging whether the measurement of the new call block rate exceeds the threshold block value of new call as the reference of communication service quality in the current cell and whether the measurement of the handoff failure rate exceeds a pre-set threshold failure value.

7. A call control method for handoff guarantee in a mobile terminal according to claim 6, wherein the step of adjusting the amount of the bandwidth comprises: reducing the amount of the reserved bandwidth by judging that the bandwidth is excessively reserved for handoff if the measurement of the new call block rate exceeds the threshold block value of new call which is the reference of the communication service quality of the current cell and the measurement of the handoff failure rate does not exceed the pre-set threshold failure value.

8. A call control method for handoff guarantee in a mobile terminal according to claim 6, wherein the step of adjusting the amount of the bandwidth comprises: increasing the reserved bandwidth by judging that the bandwidth is insufficiently reserved for handoff if the measurement of the new call block rate does not exceed the threshold block value of new call which is the reference of the communication service quality of the current cell and the measurement of the handoff failure rate exceeds the pre-set threshold failure value.

9. A call control method for handoff guarantee in a mobile terminal according to claim 6, wherein the reserved bandwidth for handoff is not adjusted by judging that the service quality is satisfied if the measurement of the new call block rate does not exceed the threshold block value of new call which is the reference of the communication service quality of the current cell and the measurement of the handoff failure rate does not exceed the pre-set threshold failure value.

10. A call control method for handoff guarantee in a mobile terminal according to claim 6, further comprising the step of subdividing the cell by judging that users are concentrated in the current cell exceeding the limit of cell capacity if the measurement of the new call block rate is maintained at least the threshold block value of new call which is the reference of communication service quality of the current cell and the measurement of the handoff failure rate is maintained at least the pre-set threshold failure value for a predetermined time.

11. A record medium readable by a digital processing device recording a tangibly embodied program of instructions executable by the digital processing device for performing a call control method for handoff guarantee in a mobile terminal, wherein the program is executed in the following steps of:

(a) judging whether the requested minimum bandwidth of handoff is allocable within the currently reserved bandwidth to allocate the requested minimum bandwidth if allocable, when a received handoff call requests the maximum and minimum bandwidths used in a previous call from a base station of a destination cell of the mobile terminal;

(b) if not allocable, judging whether the available bandwidth exists in the unreserved bandwidth of the current cell to approve the corresponding call if available and regulate the corresponding call to stand by in a handoff queue if unavailable;

judging whether the standby time of the handoff call in the handoff queue exceeds the maximum allowable handoff expiration time to approve the handoff call if not exceeds and block the handoff call if exceeds;

allocating the minimum one of the requested maximum bandwidth and the added value of the reserved bandwidth and the available bandwidth in the unreserved bandwidth of the cell; and requesting a bandwidth reservation from an adjacent cell and requesting a previous base station of the handoff call to cancel the bandwidth reserved to a previously adjacent cell.

12. A record medium according to claim 11, further comprising the step of blocking the new call if the requested maximum bandwidth is not allocable within the available bandwidth of the current cell or the standby call exists in the handoff queue.

13. A record medium according to claim 11, wherein the call has a guaranteed traffic type.

14. A record method according to claim 11, further comprising the step of periodically monitoring new call block rate and handoff failure rate by measuring the same to adjust the amount of the bandwidth according to a result of monitoring.

15. A record medium according to claim 14, wherein the step of adjusting the amount of the bandwidth comprises: adjusting the bandwidth reserved for handoff by judging whether the measurement of the new call block rate exceeds the threshold block value of new call as the reference of communication service quality in the current cell and whether the measurement of the handoff failure rate exceeds a pre-set threshold failure value.

16. A record medium according to claim 15, wherein the step of adjusting the amount of the bandwidth comprises: reducing the amount of the reserved bandwidth by judging that the bandwidth is excessively reserved for handoff if the measurement of the new call block rate exceeds the threshold block value of new call which is the reference of the communication service quality of the current cell and the measurement of the handoff failure rate does not exceed the pre-set threshold failure value.

17. A record medium according to claim 15, wherein the step of adjusting the amount of the bandwidth comprises: increasing the reserved bandwidth by judging that the bandwidth is insufficiently reserved for handoff if the measurement of the new call block rate does not exceed the threshold block value of new call which is the reference of the communication service quality of the current cell and the measurement of the handoff failure rate exceeds the pre-set threshold failure value.

18. A record medium according to claim 15, wherein the reserved bandwidth for handoff is not adjusted by judging that the service quality is satisfied if the measurement of the new call block rate does not exceed the threshold block value of new call which is the reference of the communication service quality of the current cell and the measurement of the handoff failure rate does not exceed the pre-set threshold failure value.

19. A record medium according to claim 15, further comprising the step of subdividing the cell by judging that users are concentrated in the current cell exceeding the limit of cell capacity if the measurement of the new call block rate is maintained at least the threshold block value of new call which is the reference of communication service quality of the current cell and the measurement of the handoff failure rate is maintained at least the pre-set threshold failure value for a predetermined time.

* * * * *

UNITED STATES PATENT AND TRADEMARK OFFICE
CERTIFICATE OF CORRECTION

PATENT NO.     : 6,941,141 B2
DATED          : September 6, 2005
INVENTOR(S)    : Jun Seok Park et al.

It is certified that error appears in the above-identified patent and that said Letters Patent is hereby corrected as shown below:

Title page,
Item [73], Assignee, "Electronics and Telecommunications" should be -- Electronics and Telecommunications Research Institute --.

Signed and Sealed this

Twenty-second Day of November, 2005

JON W. DUDAS
*Director of the United States Patent and Trademark Office*